Dec. 13, 1955  J. P. K. FONTAINE  2,726,878
TRACTOR FIFTH WHEEL CONSTRUCTION FOR TRAILER COUPLING
Filed Oct. 18, 1954  2 Sheets-Sheet 1

INVENTOR.
JOHN P. K. FONTAINE
BY
Jennings & Carter
ATTORNEYS

Dec. 13, 1955   J. P. K. FONTAINE   2,726,878
TRACTOR FIFTH WHEEL CONSTRUCTION FOR TRAILER COUPLING
Filed Oct. 18, 1954   2 Sheets-Sheet 2

INVENTOR.
JOHN P. K. FONTAINE
BY
Jennings & Carter
ATTORNEYS

United States Patent Office 2,726,878
Patented Dec. 13, 1955

2,726,878

TRACTOR FIFTH WHEEL CONSTRUCTION FOR TRAILER COUPLING

John P. K. Fontaine, Birmingham, Ala.

Application October 18, 1954, Serial No. 462,673

6 Claims. (Cl. 280—434)

This invention relates to a device for coupling a tractor vehicle to a trailer, and is commonly referred to in the art as a fifth wheel. In particular it comprises improvements on the device described and claimed in Patent No. 2,456,826 issued to me and Arnoldus S. Brumby, December 21, 1948.

An object of my invention is to provide a trailer coupler including a locking member for engaging the king pin on the trailer and a wedging member for holding the locking member in engagement with the king pin together with simple improved mechanism for operating said members when coupling and uncoupling.

More specific objects of my invention are the provision, in a trailer coupler including a wedge member and a locking member movable transversely across in front of the king pin; (a) an operating lever biased toward coupled position and provided with means to engage and move first the wedge member and then the locking member when uncoupling; (b) a floating guide member operable to effect rectilinear movement of the wedge member and the locking member in unison during a part of the coupling movement thereby preventing binding of the members; and (c) the provision of simple latch means operable upon moving the operating lever to uncoupled position to latch the wedge member and locking member in "out" or uncoupled position and operable upon engagement by the king pin to release and permit movement of the wedge and locking members to the "in" or coupled position.

Apparatus embodying features of my invention is illustrated in the accompanying drawings forming a part of this application in which.

Figure 4:
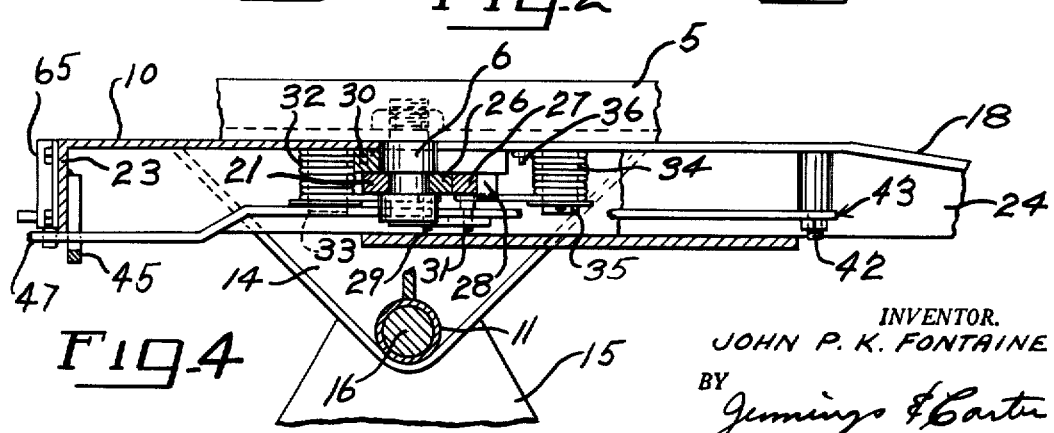
Fig. 4 is a longitudinal sectional view through the coupler in its position when coupled to a tractor vehicle; and, Fig. 5 is a detail fragmental view showing the latch for holding the operating lever in coupled position.

Referring to the drawings, I show in Fig. 4 a fragment of a trailer 5 having a king pin 6 to be coupled to a tractor vehicle as hereinafter described. My improved coupler embodies a fifth wheel plate 10 which is supported in bearings 11 and 12 carried by brackets 13 and 14 mounted on the underside of the plate and cooperating with similar brackets 15 on the tractor vehicle, only one being shown. Bearing shaft 16, such as is disclosed in my prior Patent 2,661,960, dated December 8, 1953, extends across the plate within the bearing sleeves 11 and 12.

The fifth wheel plate 10 is provided with a radial slot 17 which flares outwardly at 18 and terminates inwardly in a U-shape as shown at 19. Mounted on the underside of the plate is a bearing block 21 against which the king pin 6 of the trailer 5 bears when the trailer is coupled to the tractor. A reinforcing flange 23 may extend entirely around the plate and the sides of the slot 17 are preferably reinforced by a flange shown at 24. Lateral openings are provided in the flange 24 through which a locking member 26 and a wedge member 27 pass. Guide members 28 and 28a are mounted on the outer side of the wedge member 27 to restrain any outward movement of the pin 6 in the slot 17. Mounted on the outer end of the locking member 26 is a downwardly depending pin 29 and mounted on the outer end of the wedge member 27 is a depending pin 31. A relatively heavy torsion spring 32 has one end surrounding the pin 29 and at its opposite end is wound around a post 33 mounted on the underside of the fifth wheel plate 10 and anchored to a pin 30. The spring 32 thereby biases the locking member 26 toward coupled position. Similarly, a heavy torsion spring 34 has one end surrounding the pin 31 and the opposite end is wound about a post 35 secured to the underside of the fifth wheel plate and is anchored to a pin 36, thereby to bias the wedging member 27 toward coupled position. A set screw 37 passes through a post 38 secured to the underside of the fifth wheel plate and limits inward movement of the wedging member 27. Lock nuts 39 and 41 serve to hold the set screw in adjusted position.

Figure 1:
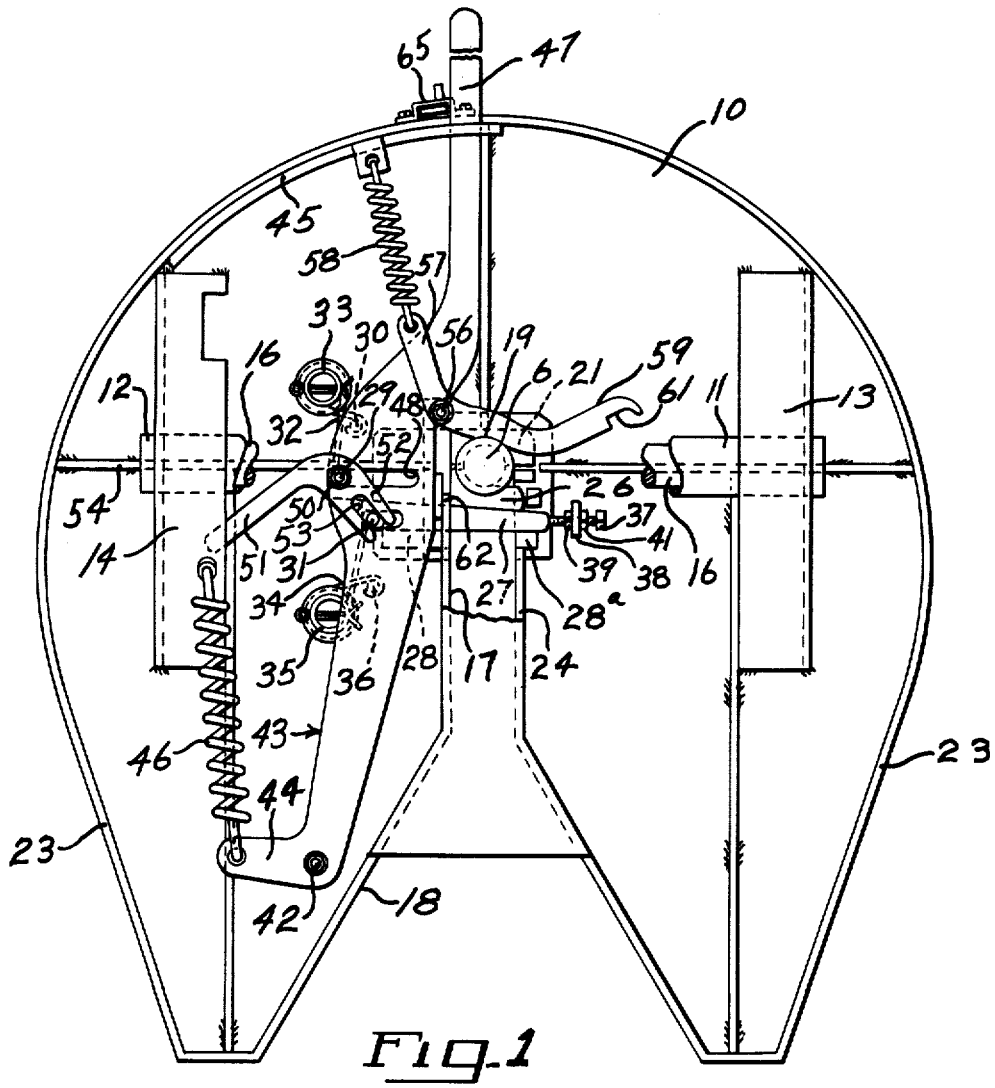
Fig. 1 is a bottom plan view with parts broken away and in section showing the coupler in coupled position.

Pivotally mounted at 42 on the fifth wheel plate 10 near the flaring opening 18 is an operating lever 43. The lever 43 has a short arm portion 44 to which a spring 46 is attached and which is connected at its other end to the bearing bracket 14 whereby to bias the operating lever toward coupled position. The opposite end 47 of the operating lever 43 extends outwardly of the fifth wheel plate above a guide bar 45 in position to be grasped by an operator whenever it is desired to uncouple the trailer from the tractor. As shown in Fig. 4 of the drawings, the operating lever 43 underlies the locking member 26 and the wedging member 27. A slot 48 receives the downwardly extending pin 29 on the locking member 26 and a shorter slot 49 receives the pin 31 on the wedging member 27. When the members 26 and 27 are in coupled position, as shown in Fig. 1 of the drawing, the pin 29 is near the outer end of the slot 48 while the pin 31 is intermediate the ends of the slot 49. It will also be seen that the pin 29, in that position, is disposed farther out than the pin 31. Accordingly, it will be apparent that when the operating lever 43 is moved from the coupled position shown in Fig. 1 toward the uncoupling position, shown in Fig. 2 of the drawing, the pin 31 is first engaged by the inner end of the slot 49, thus first releasing the wedge member 27 and starting it to move toward uncoupled position. Further movement of the operating lever causes the pin 29 to be engaged by the inner end of the slot 48 and starts the movement of the locking member 26 toward unlocked position.

Figure 2:
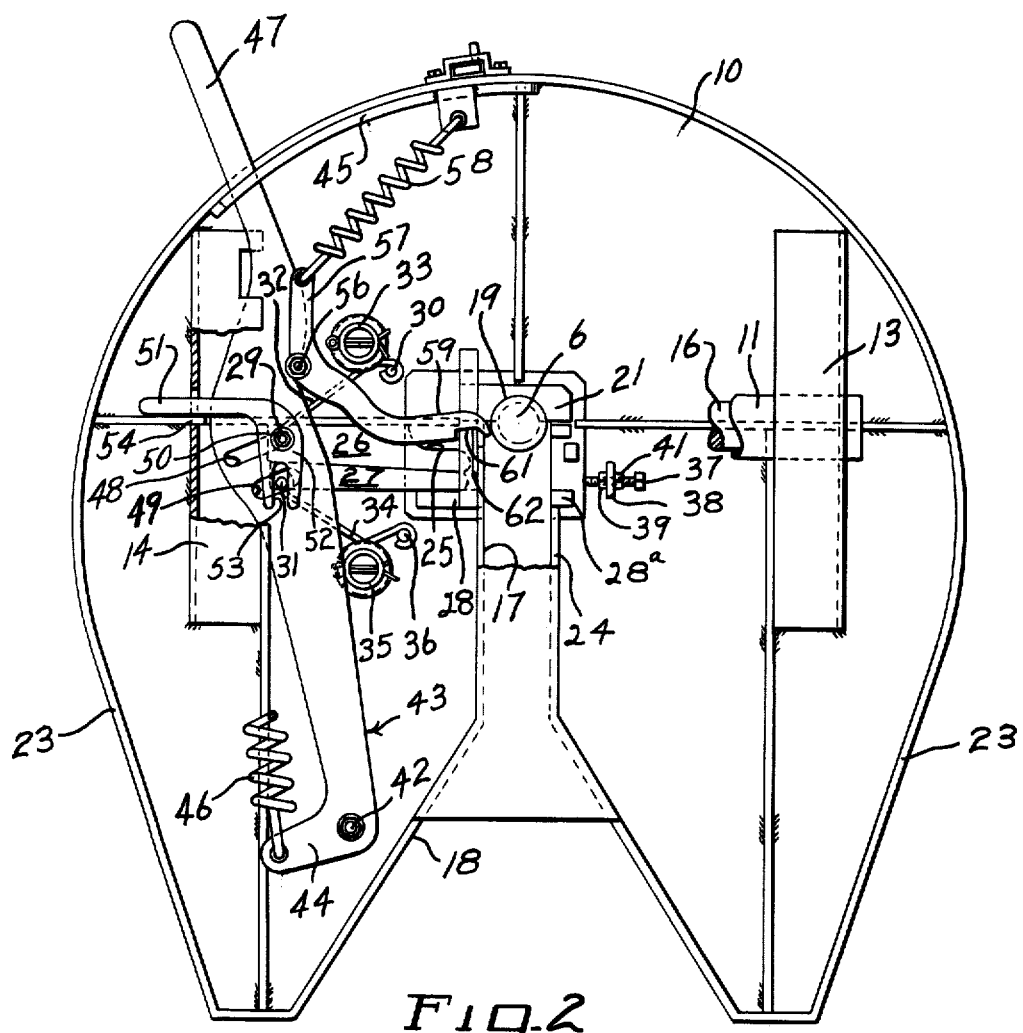
Fig. 2 is a similar view showing the coupler in uncoupling position and with the king pin ready to leave the radial slot in the fifth wheel plate.

Pivotally mounted on the pin 29, carried by the locking member 26, and held in place by a nut 50 is a floating guide member in the form of a bell crank having one arm 51 extending outwardly from the pin 29 and an arm 52 extending toward the pin 31 as viewed in Figs. 1 and 2 of the drawing. A slot 53 in the arm 52 straddles the pin 31, carried by the wedging member 27. When the parts described are in coupled position, as shown in Fig. 1, the arm 52 is held in its inward position by the pin 31 bearing against the side of the slot 53 and the arm 51 extends outwardly and downwardly as viewed in Figs. 1 and 2 of the drawing. Upon movement of the operating lever 43 from coupled toward uncoupled position, it first engages the pin 31 and starts moving it and the wedge member 27 outwardly. This causes the arm 51 to swing upwardly, as viewed in Figs. 1 and 2, about the pin 29 as a pivot. By the time the inner end of the slot 48 has engaged the pin 29, the arm 51 has risen to a horizontal position, as viewed in the drawings, and upon further movement moves outwardly behind a guide post, or plate, 54 mounted under the fifth wheel plate. Further movement to completely uncoupled position, as shown in Fig. 2, limits movement of the wedging member 27 and the locking member 26 to rectilinear movement in unison.

Upon movement of the operating arm from uncoupled toward coupled position, the locking and wedge members are moved inwardly by the springs 32 and 34 and the operating lever is moved inwardly by the force of the spring 46. The floating guide member, by reason of engagement of the arm 51 with the post 54 and engagement of the arm 52 with the pin 31 causes the locking and wedging members to move inwardly in a rectilinear direction in unison until arm 51 passes the point of engagement on 54, at which time arm 51 swings downward, as viewed in the drawing and allows wedge member 27 to move inwards until it is snug against the locking member 26, as shown in Fig. 1, thereby causing the locking member 26 to engage the king pin 6, taking up all slack.

Figures 3, 5:
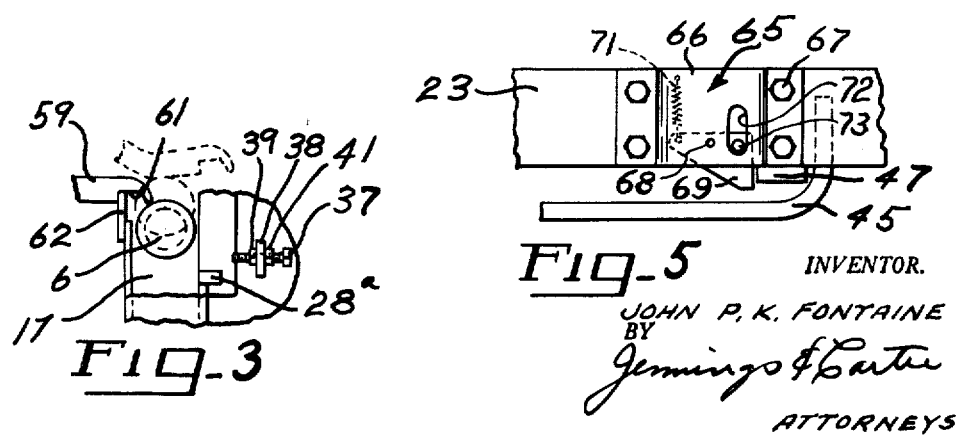
Fig. 3 is a detail view showing the king pin entering the slot and disengaging the latch arm.

Pivotally mounted on the operating lever 43 at 56, intermediate its ends, is a latch arm having its end 57 connected by a spring 58 to the fifth wheel plate. The other end 59, when the parts are in coupled position, extends across in front of, and bears against the king pin 6. The free end 59 of the latch arm is provided with an elongated notch 61 which, when the parts are in uncoupled position as shown in Fig. 3 of the drawing, engages a detent 62 mounted alongside the slot 17. As will be seen in Fig. 3, the free end 59 of the arm, when the king pin is out of the slot 17 in the fifth wheel plate extends into the path of the king pin 6 as it enters the slot toward coupled position. This frees the notch 61 from the detent 62 so that, as the operating arm 43 moves to coupled position the springs 46 and 58 again pull the free end 59 of the latch arm back to the position shown in Fig. 1. When uncoupling, the operating arm 43 is moved to the position shown in Fig. 2, by pulling the outwardly extending portion 47 towards uncoupled position. The free end 59 of the latch arm is then moved downwardly, as viewed in the drawing, by the spring 58, to the position shown in Fig. 2 where it is bearing against the side of the king pin 6. The king pin is thus ready to move out of the slot 17 to allow the notch 61 to engage the detent 62 as shown in Fig. 3 of the drawing.

From the foregoing description, the operation of my improved coupler will be readily understood. When the parts are in coupled position as shown in Fig. 1 of the drawing, the outwardly extending portion 47 of the operating arm 43 is held in the position shown by a manually operable latch 65. The latch comprises a U-shaped strap 66 secured to the flange 23 by bolts 67. Positioned inwardly of the strap 66 and mounted for vertical movement about a pivot pin 68 is a latch member 69 which is urged downwardly toward latched position by a spring 71. Secured to the latch member 69 and projecting outwardly through a suitable slot 72 in the strap 66 is an operating pin 73 for moving the latch member 69 about its pivot pin. The locking member 26 is bearing snugly against the king pin 6 by its curved seat portion 25 and is held in this position by the wedge member 27 which bears against the rearward side of the locking member, being the underside as viewed in Figs. 1 and 2 of the drawings. As the operating lever moves outward, the inner end of the slot 49 first engages the pin 31 on the wedge member 27 and starts it moving outward. As it does so, it swings the floating guide member about its pivot 29 toward a horizontal position as viewed in Figs. 1 and 2. The inner end of the slot 48 then engages the pin 29 and starts moving the locking member 26 outward with the arm 51 engaged behind the guide plate 54. The locking member 26 and wedging members 27 are then moved outwardly in unison to the position shown in Fig. 2. As the operating arm moves outwardly, the latch arm is pulled across the king pin 6 until the free end 59 is pulled against the detent 62 by the spring 58. The king pin 6 is then free to leave the notch 17, whereupon the arm end 59 moves inwardly until the inner end of the notch 61 engages the detent 62 to hold the parts in uncoupled position. In recoupling, the king pin 6 strikes the free end 59 of the latch arm and releases it from the detent 62, whereupon it assumes the position shown in Fig. 1 of the drawings.

From the foregoing it will be apparent that I have devised a trailer coupler which is simple of design and reliable in operation. When the parts are in coupled position, as shown in Fig. 1, the outwardly extending portion 47 of the operating lever is readily accessible for release and movement manually toward the uncoupling position shown in Fig. 2. After the king pin 6 has left the position shown in Fig. 2, the latch arm effectively holds the parts in uncoupled position until the king pin again enters the slot 17 and displaces the latch. When the parts are coupled, should the trailer be on a grade so as to exert a strain or pressure against the locking and wedging members, they cannot be moved manually to uncoupled position until the trailer is effectively blocked and the strain removed.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a trailer coupler embodying a fifth wheel plate having a radial opening terminating in a slot for receiving a king pin, a locking member movable across the slot to retain the king pin when coupled, a wedge member movable across the slot alongside the locking member to limit relative motion between the king pin and the locking member, an operating lever for moving the locking and the wedge members to coupled and uncoupled positions pivoted to the fifth wheel plate and underlying the wedge member and the locking member and having an elongated transverse slot therein under the wedge member and under the locking member, a pin on the wedge member and a pin on the locking member extending downwardly into the slots, said pins being disposed to be engaged by the slots during movement of the operating lever from coupled to uncoupled position, and a guide member pivotally mounted on the locking member with a sliding connection with the wedge member and engageable during a part of the coupling and uncoupling movements with a stationary part on the fifth wheel plate to limit movement of the locking and wedging members to a rectilinear path in unison.

2. In a trailer coupler embodying a fifth wheel plate having a radial opening terminating in a slot for receiving a king pin, a locking member movable across the slot to retain the king pin when coupled, a wedge member movable across the slot alongside the locking member to limit relative motion between the king pin and the locking member, an operating lever for moving the locking and the wedge members to coupled and uncoupled positions pivoted to the fifth wheel plate and underlying the wedge member and the locking member and having an elongated transverse slot therein under the wedge member and under the locking member, a pin on the wedge member and a pin on the locking member extending downwardly into the slots said pins being disposed to be engaged by the slots during movement of the operating lever from coupled to uncoupled position, a floating guide member pivotally mounted on the pin on the locking member and having a slotted arm engaging the pin on the wedge member, said guide member having another arm disposed to engage a stationary part on the fifth wheel plate and limit movement of the locking and the wedging members to a rectilinear path in unison during a part of the coupling and uncoupling movements.

3. Apparatus as defined in claim 2 in which the operating lever is disposed to engage the pin on the wedging member and move it first when starting toward uncoupled position and the floating guide member is disposed to engage the stationary part on the fifth wheel plate after the operating lever has engaged and started the locking member toward uncoupled position.

4. Apparatus as defined in claim 3 in which the operating lever, the locking member, and the wedge member are all spring biased toward coupled position.

5. In a trailer coupler embodying a fifth wheel plate having a radial opening terminating in a slot for receiving a king pin, a locking member movable across the slot to retain the king pin when coupled, a wedge member movable across the slot alongside the locking member to limit relative motion between the king pin and the locking member, an operating lever for moving the locking and the wedge members to coupled and to uncoupled positions pivoted to the plate and underlying the locking and the wedge members, pin and slot connections between the operating lever and the wedge and locking members, guide means cooperating between the said wedge and locking members and the fifth wheel plate effective to limit movement of said members to a rectilinear path during a part of the coupling and uncoupling movements, a latch member pivotally mounted intermediate its ends on the operating lever and having one end engaged by and extending across the king pin when in coupled position and adapted to be withdrawn to a position to engage the side of the king pin when the lever is moved to uncoupled position, a detent on the fifth wheel plate adjacent the king pin and a notch on the adjacent end of the latch member positioned to engage the detent when the operating lever is moved to uncoupled position and the king pin removed, said latch member then lying in the path of the king pin when coupling to be returned thereby to coupled position.

6. In a trailer coupler embodying a fifth wheel plate having a radial opening terminating in a slot for receiving a king pin, a locking and a wedge member movable across the slot to coupled position to retain the king pin in place, an operating lever for moving the locking and wedge members from coupled to uncoupled positions pivoted to the fifth wheel plate, slot and pin connections connecting the operating lever to the locking and the wedge members, means biasing the locking member, the wedge member and the operating lever toward coupled positions, a latch arm pivoted intermediate its ends to the operating lever and having its free end extending across the slot in front of the king pin when in coupled position, a spring connected to the latch arm to bias its free end inwardly of the slot, a detent alongside the king pin, a notch in the free end of the latch arm disposed to engage the detent when the operating lever with the latch arm is moved to uncoupled position and thereby hold the operating lever with its locking member and wedging member in uncoupled position, the free end of said latch member then lying in the path of the king pin when coupling to be disengaged from the detent.

References Cited in the file of this patent

UNITED STATES PATENTS

| | | |
|---|---|---|
| 2,456,826 | Fontaine | Dec. 21, 1948 |
| 2,676,817 | White | Apr. 27, 1954 |

Disclaimer 2,726,878.—*John P. K. Fontaine*, Birmingham, Ala. TRACTOR FIFTH WHEEL CONSTRUCTION FOR TRAILER COUPLING. Patent dated Dec. 13, 1955. Disclaimer filed Apr. 13, 1961, by the inventor.

Hereby enters this disclaimer to claims 1, 2, 3, 4, 5, and 6 of said patent.
[*Official Gazette May 16, 1961.*]